US012646269B2

(12) United States Patent
Chakraborty et al.

(10) Patent No.: US 12,646,269 B2
(45) Date of Patent: Jun. 2, 2026

(54) THREE DIMENSIONAL SPATIAL INSTRUCTIONS FOR ARTIFICIAL INTELLIGENCE ASSISTANCE AUTHORING

(71) Applicant: Microsoft Technology Licensing, LLC, Redmond, WA (US)

(72) Inventors: Ishani Chakraborty, Seattle, WA (US); Mahdi Rad, Zurich (CH); Harpreet Singh Sawhney, Redmond, WA (US); Marc André Léon Pollefeys, Zurich (CH); Andrew Klein, Vancouver (CA); Cedric Sze-Ching Lee, Vancouver (CA); Gavin Jancke, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 18/534,416

(22) Filed: Dec. 8, 2023

(65) Prior Publication Data

US 2025/0191307 A1 Jun. 12, 2025

(51) Int. Cl.
*G06T 19/00* (2011.01)
*G10L 15/26* (2006.01)

(52) U.S. Cl.
CPC ............ *G06T 19/006* (2013.01); *G10L 15/26* (2013.01)

(58) Field of Classification Search
None
See application file for complete search history.

(56) References Cited

U.S. PATENT DOCUMENTS

2014/0310595 A1 10/2014 Acharya et al.
2022/0122327 A1 4/2022 Bilgory
2023/0342677 A1 10/2023 Desai
2023/0343044 A1 10/2023 Greunke
2024/0394593 A1 * 11/2024 Gutierrez ............... G06N 5/022

OTHER PUBLICATIONS

International Search Report and Written Opinion received for PCT Application No. PCT/US2024/055808, mailed on Mar. 12, 2025, 19 pages.

(Continued)

*Primary Examiner* — Nicholas R Wilson
(74) *Attorney, Agent, or Firm* — NovoTechIP International PLLC

(57) ABSTRACT

A data processing system implements receiving a first request to collaboratively author a mixed reality experience with a vision-language model planner, the mixed reality experience comprising an interactive guide for performing a task involving a complex multipart object; obtaining 3D object geometry information for the complex multipart object; obtaining a description of the task to be performed including a plurality of subtasks each associated with a user action to be performed on a respective part of the complex multipart object; constructing a prompt to the model, the prompt instructing the model to generate a task list based on the geometry information and the description of the task to be performed; providing the prompt as an input to the model to obtain the task list; and generating content for the mixed reality experience using the task list in response to a second request to execute the mixed reality experience.

19 Claims, 11 Drawing Sheets

(56) References Cited

OTHER PUBLICATIONS

Torre, et al., “LLMR: Real-time Prompting of Interactive Worlds using Large Language Models”, arxiv.org, Cornell University Library, 201 Olin Library Cornell University Ithaca, NY 14853, Sep. 21, 2023, 50 pages.
Wang, et al., “HoloAssist: an Egocentric Human Interaction Dataset for Interactive AI Assistants in the Real World”, In Proceedings of the IEEE/CVF International Conference on Computer Vision, 2023, pp. 20270-20281.

* cited by examiner

322 — Access the mixed reality experience information datastore

324 — Generate prompt to language model to initialize the mixed reality experience 326 — Monitor user inputs and actions 328 — Generate prompts to language model to update the state of the mixed reality experience based on user inputs and mixed reality experience information

320

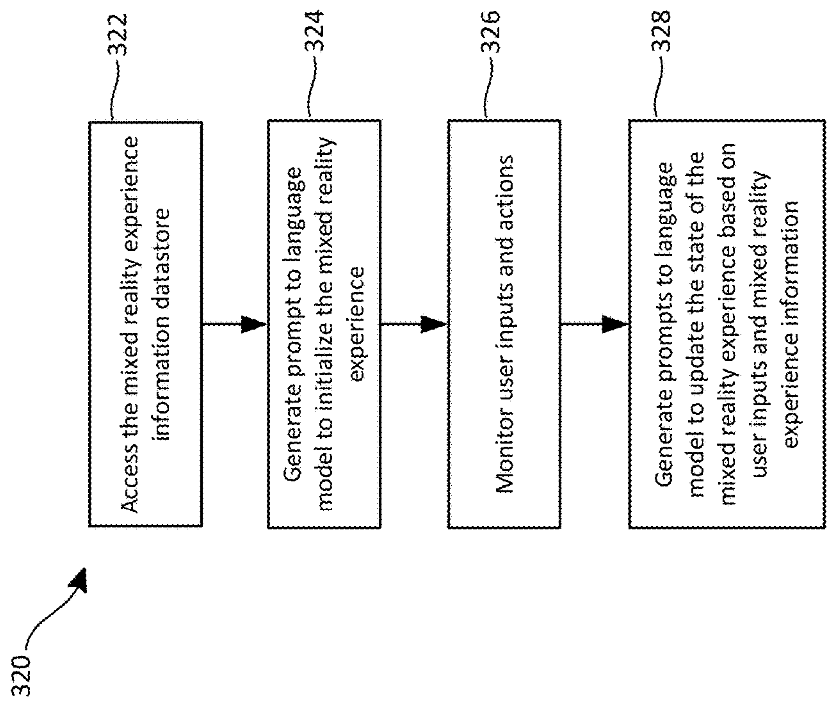

FIG. 3B

302 — Prompt the user to provide description of one or more subtasks of a task

304 — Obtain description of each of the subtasks of the task from the user

306 — Prompt the user to generate 3D representation of object associated with each subtask 308 — Prompt user to demonstrate each of the subtasks 310 — Prompt model to generate task list 312 — Store mixed reality experience information in datastore

300

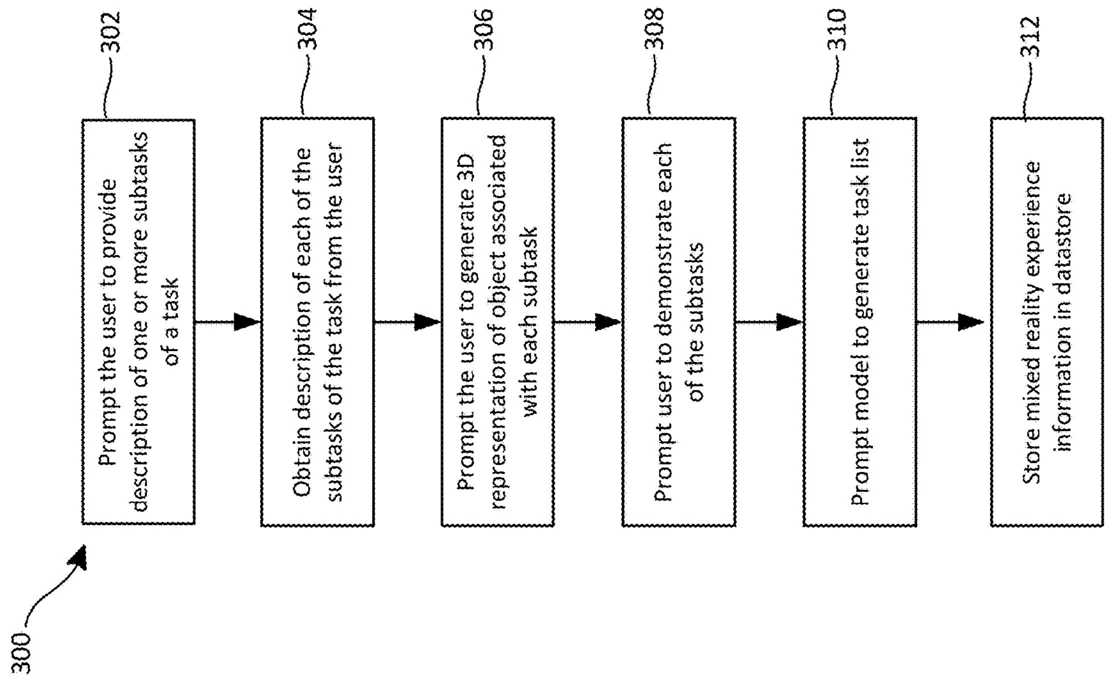

FIG. 3A

372 Determine hand trajectory for user action

374 Determine filtered sub-path by velocity

376 Select symbol from among symbols in symbol datastore

378 Determine 3D pose for symbol

370

342 Capture multiple views of object

344 Perform interactive segmentation on selected keyframes

346 Propagate segmentation to remaining keyframes

348 Geometry-based multiple view fusion

340

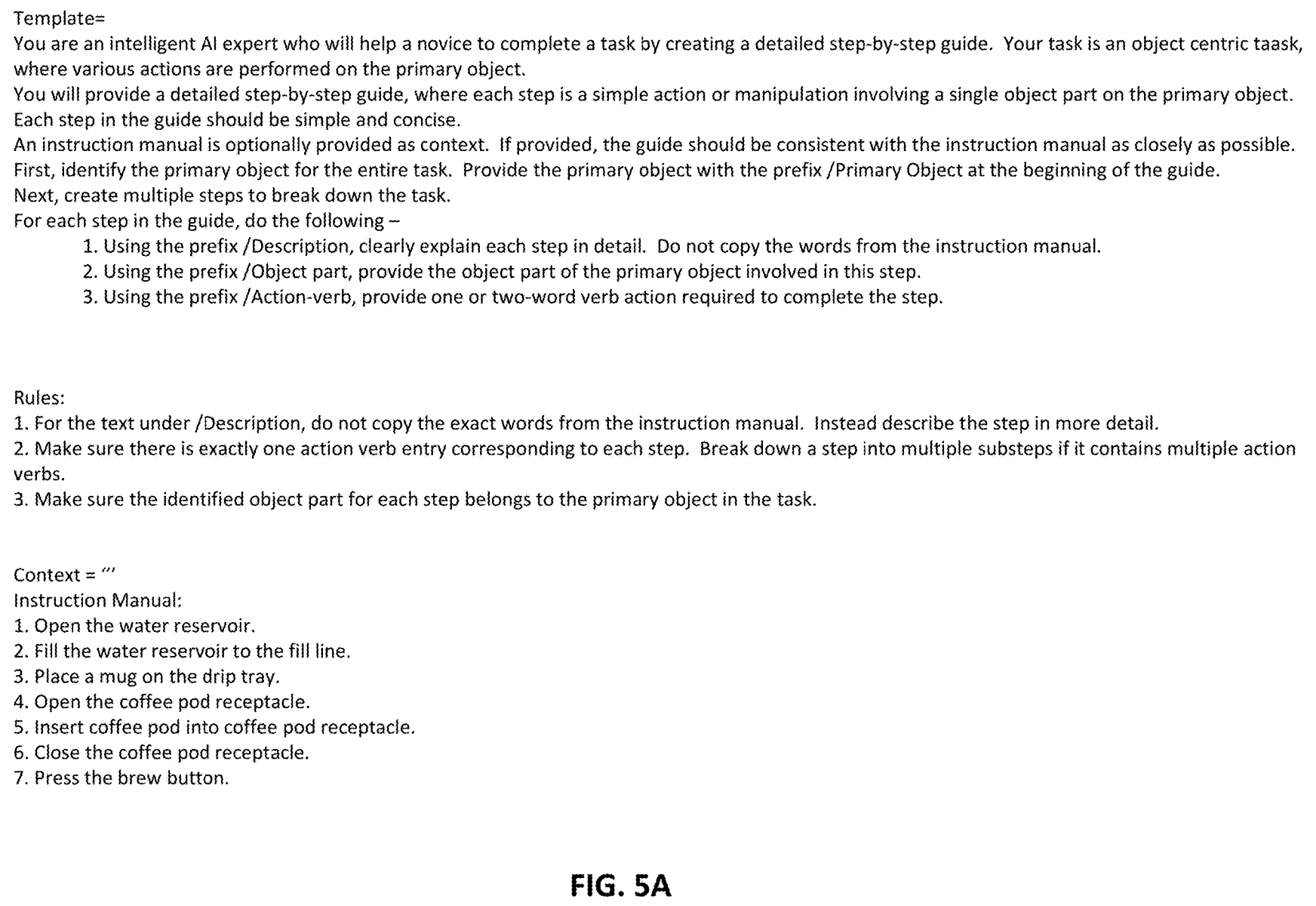

Template=
You are an intelligent AI expert who will help a novice to complete a task by creating a detailed step-by-step guide. Your task is an object centric taask, where various actions are performed on the primary object.
You will provide a detailed step-by-step guide, where each step is a simple action or manipulation involving a single object part on the primary object.
Each step in the guide should be simple and concise.
An instruction manual is optionally provided as context. If provided, the guide should be consistent with the instruction manual as closely as possible.
First, identify the primary object for the entire task. Provide the primary object with the prefix /Primary Object at the beginning of the guide.
Next, create multiple steps to break down the task.
For each step in the guide, do the following –

1. Using the prefix /Description, clearly explain each step in detail. Do not copy the words from the instruction manual.
2. Using the prefix /Object part, provide the object part of the primary object involved in this step.
3. Using the prefix /Action-verb, provide one or two-word verb action required to complete the step.

Rules:
1. For the text under /Description, do not copy the exact words from the instruction manual. Instead describe the step in more detail.
2. Make sure there is exactly one action verb entry corresponding to each step. Break down a step into multiple substeps if it contains multiple action verbs.
3. Make sure the identified object part for each step belongs to the primary object in the task.

Context = "'
Instruction Manual:
1. Open the water reservoir.
2. Fill the water reservoir to the fill line.
3. Place a mug on the drip tray.
4. Open the coffee pod receptacle.
5. Insert coffee pod into coffee pod receptacle.
6. Close the coffee pod receptacle.
7. Press the brew button.

FIG. 5A

| Subtask | Object | Action | Object Part | Object Part Location | Interaction Region |
|---|---|---|---|---|---|
| Fill the water tank | Water tank lid | Open | Hinge | Rear of lid | Water tank opening |
| Fill the water tank | Water tank | Fill | Water Level Indicator | Inside water tank | Water tank opening |
| Fill the water tank | Water tank lid | Close | Hinge | Read of lid | Water tank opening |
| Turn on the machine | Power button | Press | Button surface | Front of the machine | Power button |
| Open capsule holder | Lever | Lift | Lever hinge | Front of capsule holder | Capsule holder |
| Insert coffee capsule | Coffee capsule | Insert | Capsule holder opening | Inside of capsule holder | Capsule holder |
| Close capsule holder | Level | Lower | Lever hinge | Front of capsule holder | Capsule holder |
| Place coffee cup | Coffee cup | Position | Cup holder | Base of machine | Coffee outlet |
| Brew coffee | Brew button | Press | Button surface | Front of the machine | Brew button |

Receive a first request from a client device of a user for creating a mixed-reality experience associated with performing a task on a complex multipart object — 602

Obtain three-dimensional object geometry information for the multipart object — 604

Obtain a description of the task to be performed including a plurality of subtasks each associated with a user action to be performed on a respective part of the multipart object — 606

Construct a prompt to the vision-language model planner using a prompt construction unit, the prompt instructing the vision-language model planner to generate a task list based on the three-dimensional object geometry information and the description of the task to be performed — 608

Provide the prompt as an input to the vision-language model planner — 610

Obtain the task list as an output of the perceputal model — 612

Generate content for the mixed reality experience using the task list in response to a second request to execute the mixed reality experience — 614

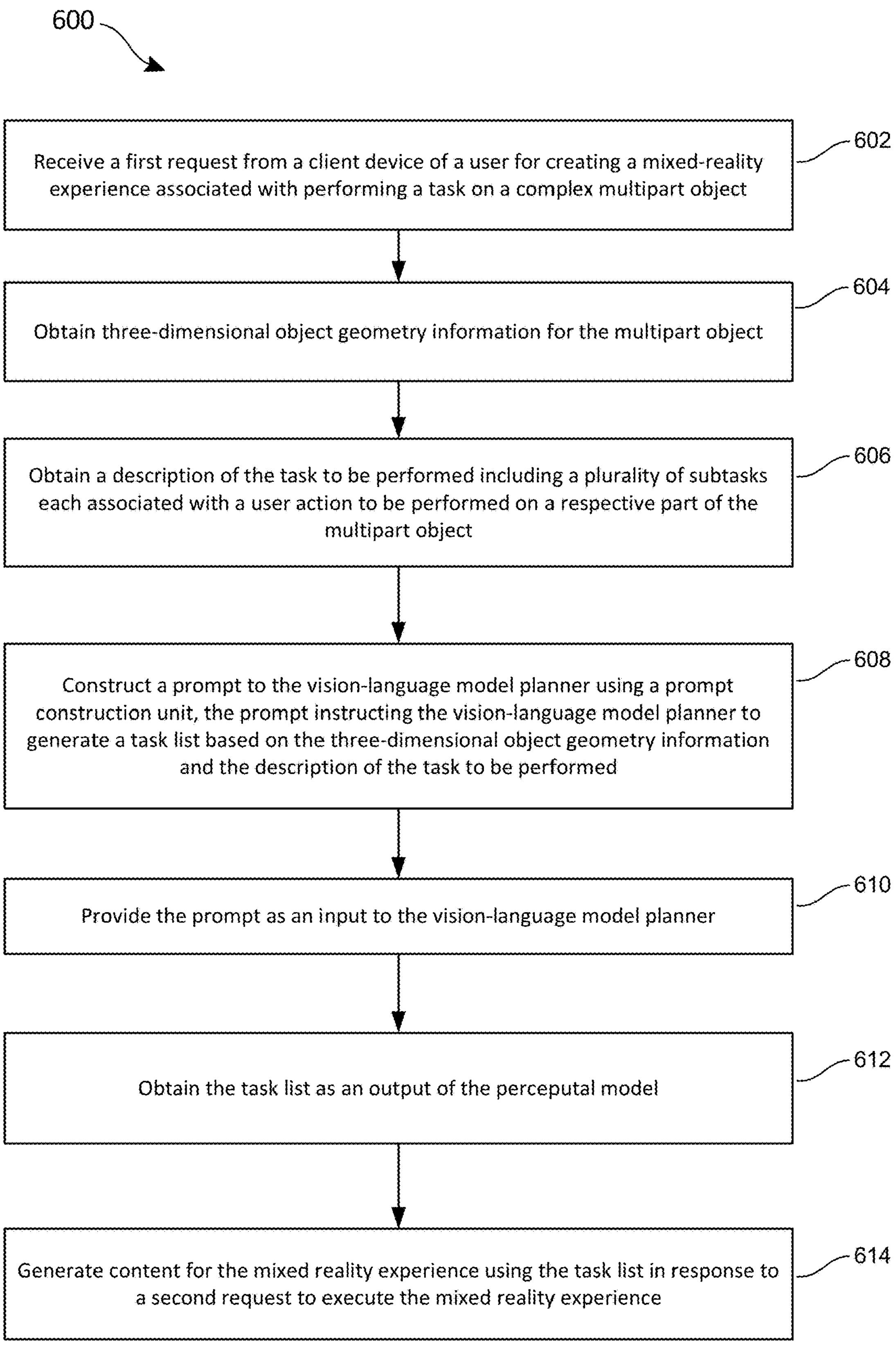

FIG. 6A

THREE DIMENSIONAL SPATIAL INSTRUCTIONS FOR ARTIFICIAL INTELLIGENCE ASSISTANCE AUTHORING

BACKGROUND

Large language models (LLMs) can assist users generate complex text in response to user prompts. LLMs have been applied to assist users with complex tasks, such as but not limited to assisting with the generation of executable program code, generating complex textual content in a variety of formats, and summarizing content from various sources. However, LLMs lack spatial awareness of the environment in which the user is located and/or objects located in that environment as well as the connection between semantic descriptors and their physical counterparts in the environment and on the objects within the environment. Consequently, the LLMs struggle with tasks that require such spatial awareness, such as providing real-time guidance to a user to perform certain tasks that require the user to interact with the environment and/or objects within that environment. Hence, there is a need for improved systems and methods that provide a technical solution for implementing spatially aware LLMs.

SUMMARY

An example data processing system according to the disclosure includes a processor and a machine-readable medium storing executable instructions. The instructions when executed cause the processor alone or in combination with other processors to perform operations including receiving a first request from a client device of a user for creating a mixed-reality experience associated with performing a task on a complex multipart object; obtaining three-dimensional object geometry information for the complex multipart object; obtaining a description of the task to be performed including a plurality of subtasks each associated with a user action to be performed on a respective part of the complex multipart object; constructing a prompt to the vision-language model planner using a prompt construction unit, the prompt instructing the vision-language model planner to generate a task list based on the three-dimensional object geometry information and the description of the task to be performed; providing the prompt as an input to the vision-language model planner; obtaining the task list from the vision-language model planner; and generating content for the mixed reality experience using the task list in response to a second request to execute the mixed reality experience.

An example method implemented in a data processing system includes receiving a first request from a client device of a user for creating a mixed-reality experience associated with performing a task on a complex multipart object; obtaining three-dimensional object geometry information for the complex multipart object; obtaining a description of the task to be performed including a plurality of subtasks each associated with a user action to be performed on a respective part of the complex multipart object; constructing a prompt to the vision-language model planner using a prompt construction unit, the prompt instructing the vision-language model planner to generate a task list based on the three-dimensional object geometry information and the description of the task to be performed; providing the prompt as an input to the vision-language model planner; obtaining the task list from the vision-language model planner; and generating content for the mixed reality experience using the task list in response to a second request to execute the mixed reality experience.

An example data processing system according to the disclosure includes a processor and a machine-readable medium storing executable instructions. The instructions when executed cause the processor alone or in combination with other processors to perform operations including receiving a request from a client device of a user to present a mixed reality experience on the client device, the mixed reality experience comprising an interactive guide for performing a task involving a complex multipart object; obtaining a task list associated with the mixed reality experience from a mixed reality experience datastore; constructing a prompt to a vision-language model planner using a prompt construction unit, the prompt instructing the vision-language model planner to initialize the mixed reality experience based on the task list; providing the prompt as an input to the vision-language model planner; generating content for the mixed reality experience based the task list using the vision-language model planner; and causing the client device of the user to present a visualization of the content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A is a flow diagram of an example process for collaborating with the spatially aware AI to create a mixed reality experience according to the techniques described herein.

FIG. 3B is a flow diagram of an example process for using spatially aware AI to present a mixed reality experience according to the techniques described herein.

FIG. 5A is an example of a prompt template that may be used by the prompt construction unit of the application services platform shown in the FIGS. 2 and 4.

FIG. 5B is an example of a task list that may be generated by the vision-language model planner shown in FIG. 2 based on the prompt shown in FIG. 5A.

FIG. 6A is a flow chart of an example process for generating content using a spatially aware language model according to the techniques disclosed herein.

DETAILED DESCRIPTION

Figure 1:
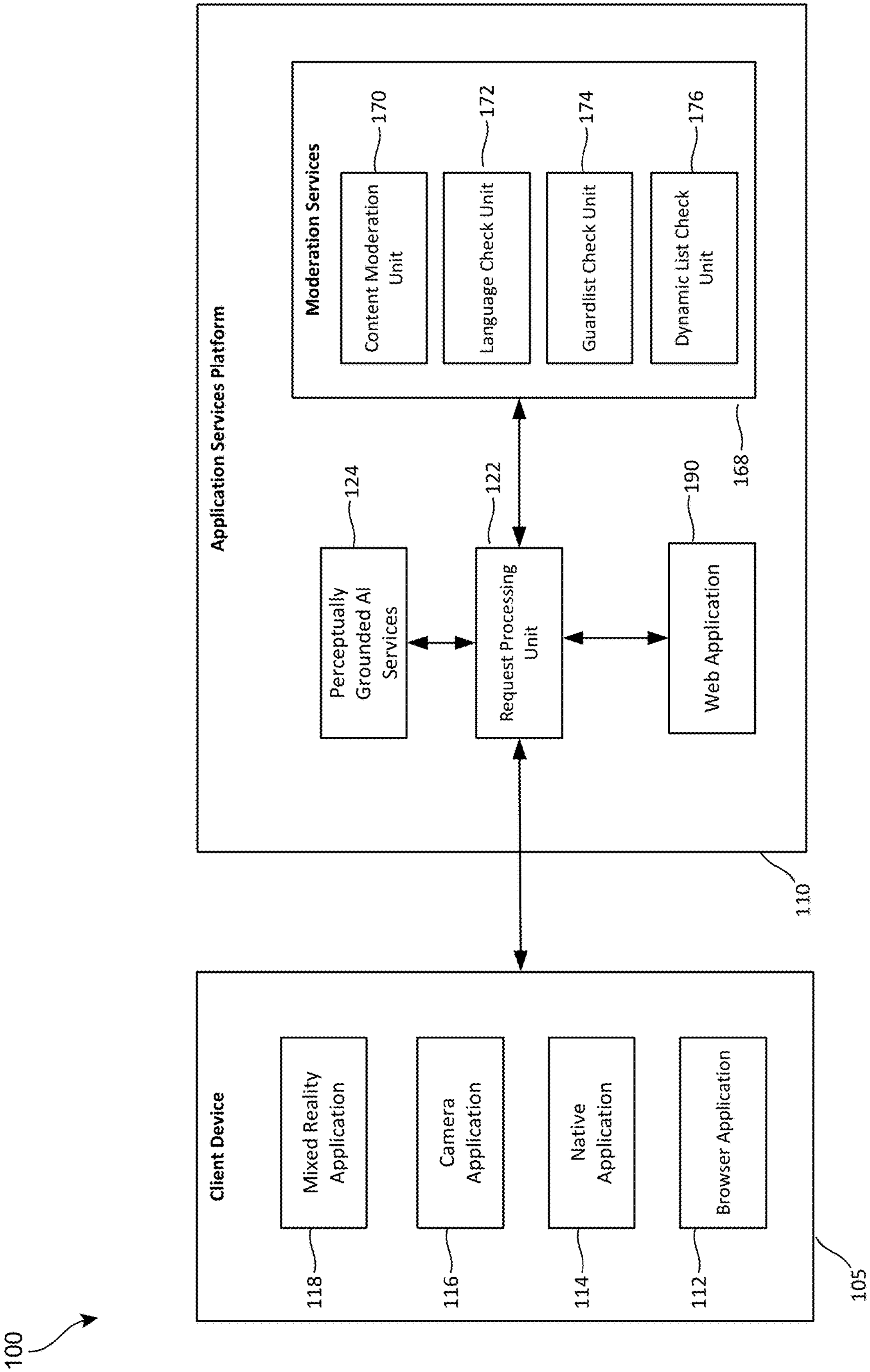
FIG. 1 is a diagram of an example computing environment in which the techniques for generating content using a spatially aware language model described herein are implemented.

Systems and methods for using a spatially and semantically aware generative artificial intelligence (AI) to generate content are described herein. These techniques provide a technical solution to the technical problem that current generative language models lack spatial-sematic awareness, also referred to as physically embodied awareness herein. Spatial-semantic awareness refers both to a spatial awareness of the environment in which the user is present as well as the object therein and to the connection between semantic descriptors and their physical counterparts in the environment and on the objects within the environment. Consequently, these models struggle with tasks that require such spatial awareness and a connection between descriptors and their physical counterparts, such as but not limited to providing real-time guidance to a user to perform certain tasks that require the user to interact with the environment and/or objects within that environment. For example, current language models would struggle to understand the phrase "turn the red knob," because the model lacks the association of "red" and "knob" with a part of a machine that is in front of a user. The techniques herein provide a spatially-semantically aware generative language model that can be used for authoring and/or consuming mixed reality experiences in which a view of a real-world scene is overlaid with digital elements and in which physical elements within the scene can interact with the digital elements. The spatially-semantically aware generative language model is used to implement a vision-language model planner. The vision-language model planner facilitates multimodal mixed-reality collaborations that enable users to collaborate with the spatially-semantically aware generative language model create and/or consume mixed media content. The vision-language model planner uses the generative model to provide spatially-semantically aware instructions to the user to execute various tasks. The vision-language model planner also interacts with, monitors, and supports the user with real-time guidance as they are performing these tasks. This support includes answering user questions about the physical objects and providing suggestions, corrections, and/or explanations to user that consider the state and context of the activity being performed. A technical benefit of this approach is that the vision-language model planner utilizes the spatially-semantically aware generative language model to plan and coordinate various actions with the user rather than merely using the model a conventional language model for generating textual content. Current language models lack this capability.

To support the features of the vision-language model planner, the spatially-semantically aware generative language model provides visual perception, language understanding, memory, affordance understanding, and multi-agent reasoning to facilitate such mixed reality experiences. Visual perception refers to the ability of the language model to recognize scenes and object therein and to anchor prompts to object parts and/or other entities within the scenes. Language understanding refers to the model being capable of translating questions and instructions included in a prompt into actions to be performed on an object or object part and/or symbols representing such actions. Memory, as used herein, refers to the ability of the model to maintain an internal world state history, which enables the model to maintain a consistent state throughout an interaction or collaboration with a user. Affordance understanding refers to the ability of the model to infer the functionality of object parts and how a user may interact with those object parts. Multi-agent reasoning refers to the ability of the model to predict the intent of the human users and to timely interact with these users. The techniques herein include techniques for modeling the geometry and semantics of objects and/or object parts in a scene, for understanding how a user may interact with the objects and/or object parts, and for generating symbolic representations of the actions that users perform and/or may perform with respect to the objects and/or object parts. A technical benefit of these techniques is that the spatially-semantically aware language model can generate content and/or collaborate with the user in the creation of content that includes interactions with such object and/or object parts due to the spatial-semantic awareness afforded by the models of the scene and the objects therein. Not only does this approach improve the output of the generative language model, but this approach can also decrease the computing resources required to obtain the generated content because the user is less likely to submit additional queries to the model to further refine the generated content. These and other technical benefits of the techniques disclosed herein will be evident from the discussion of the example implementations that follow.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled and/or cloud-enabled native applications and/to provide a mixed reality experience on the client device 105. These applications may include but are not limited to word processing applications, presentation applications, web site authoring applications, collaboration platforms, communications platforms, and/or other types of applications in which users may create, view, and/or modify various types of electronic content. In the implementation shown in FIG. 1, the application services platform 110 also supports the generation of mixed reality content using spatially-semantically aware generative AI that enables the user to collaborate with the language model to generate the mixed reality content and for users to consume the mixed reality content. The client device 105 and the application services platform 110 communicate with each other over a network (not shown). The network may be a combination of one or more public and/or private networks and may be implemented at least in part by the Internet.

The client device 105 is a computing device that may have various form factors and the application services platform 110 may interact with multiple client devices having different form factors. The client device 105 is a mixed reality headset in some instances. A mixed reality headset is a wearable device that includes a head mounted display that is transparent to provide a view of the environment surrounding the wearer in some implementations and/or displays a view of the environment that has been captured using a camera of the headset. The headset overlays digital objects over real world objects to create a mixed reality scene in which the user and/or real-world physical objects can interact with these digital objects. The perceptually grounded AI service 124 of the application services platform 110 implements spatially-semantically aware AI that enables the user of the mixed reality headset to collaborate with the spatially-semantically aware AI to author mixed reality content and/or consume mixed reality content.

The client device 105 may be implemented with other form factors. In some implementations, the client device 105 is a portable electronic device, such as a mobile phone, a tablet computer, a laptop computer, a portable digital assistant device, a portable game console, and/or other such device. The client device 105 is implemented as desktop computer, kiosk, vehicle computer system, and/or other type of computing devices in other implementations. These additional form factors for the client device 105 may be used in addition to the mixed reality headset implementations to provide the user with tools for authoring and/or consuming mixed reality content. In some such implementations, a mixed reality headset is used to capture audiovisual content for the mixed reality content, and a client device having a different form factor is used to modify and/or consume the content captured using the mixed reality headset. While the example implementation illustrated in FIG. 1 includes a single client device 105, other implementations may include a different number of client devices that utilize services provided by the application services platform 110.

The client device 105 includes a browser application 112, a native application 114, a camera application 116, and/or a mixed reality application 118 in some implementations. The native application 114 is a web-enabled native application that enables users to view, create, and/or modify electronic content. The web-enabled native application utilizes services provided by the application services platform 110 including but not limited to creating, viewing, and/or modifying various types of electronic content including collaborating with the spatially-semantically aware generative AI to generate mixed reality content. In other implementations, the browser application 112 is used for accessing and viewing web-based content provided by the application services platform 110. In such implementations, the application services platform 110 implements one or more web applications, such as the web application 190, that enables users to view, create, and/or modify electronic content including collaborating with the spatially-semantically aware generative AI to generate content. The application services platform 110 supports both the native application 114 and a web application 190 in some implementations, and the users may choose which approach best suits their needs. The camera application 116 captures images and/or video using one or more cameras of the client device 105. The cameras include at least one outward facing camera that is used to capture images and/or video of the real-world environment surrounding the client device 105 and real-world objects within this environment. The cameras may also include one or more cameras that face a user of the client device 105 to capture images and/or video of the eyes of the user to enable gaze tracking, and/or images. The mixed reality application 118 presents mixed reality content that is stored locally on the client device 105 and/or is presented at least in part by the application services platform 110.

The application services platform 110 includes a request processing unit 122, perceptually grounded AI services 124, the web application 190, and moderation services 168.

The request processing unit 122 is configured to receive requests from the native application 114 of the client device 105 and/or the web application 190 of the application services platform 110. The requests may include but are not limited to requests to create, view, and/or modify various types of electronic content and/or sending natural language prompts to the perceptually grounded AI services 124 to generate textual content according to the techniques provided herein. The request processing unit 122 also coordinates communication and exchange of data among components of the application services platform 110 as discussed in the examples which follow.

The perceptually grounded AI services 124 implement the spatially-semantically aware generative AI provided herein. These techniques enable users of the native application 114 and/or the web application 190 to collaborate with the AI generated content that includes modeling the geometry and semantics of objects and/or object parts in a scene, understanding how a user may interact with the objects and/or object parts, and generating symbolic representations of the actions that users perform and/or may perform with respect to the objects and/or object parts. Additional details of the perceptually grounded AI services 124 are shown in the example implementation shown in FIG. 2.

The request processing unit 122 receives a request to collaborate with the spatially-semantically aware AI of the perceptually grounded AI services 124 to author content and/or consume content. The content that is authored and/or consumed can include mixed reality content.

The user may collaborate with the spatially-semantically aware AI to generate new content and/or request to interact with the spatially-semantically aware AI content to experience previously created content. In a non-limiting example, a first user collaborates with the spatially-semantically aware AI to create an interactive mixed reality guide for repairing an electronic device that includes a 3D representation of the electronic device and components thereof. A second user then requests access to the mixed reality interactive guide and the spatially-semantically aware AI presents the guide on a user interface of the client device 105 of the second user. The request can be received from the native application 114 or the web application 190. Additional details of the perceptually grounded AI services 124 are described in the examples which follow.

The moderation services 168 analyze the text natural language prompts input by users of the native application 114 and/or the web application 190, and textual content generated by the vision-language model planner 206 to ensure that potentially objectionable or offensive content is not generated or utilized by the application services platform 110. If potentially objectionable or offensive content is detected, the moderation services 168 provides a blocked content notification to the client device 105 indicating that the natural language prompt, the content generated by the vision-language model planner 206, and/or the sample content included content that is blocked.

The moderation services 168 performs several types of checks on the electronic content item being accessed or modified by the user in the native application 114 or the web application 190, the natural language prompt input by the user, and/or content generated by the vision-language model planner 206. The content moderation unit 170 is implemented by a machine learning model trained to analyze the textual content of these various inputs to perform a semantic analysis on the textual content to predict whether the content includes potentially objectionable or offensive content. The language check unit 172 performs another check on the textual content using a second model configured to analyze the words and/or phrase used in textual content to identify potentially offensive language. The guard list check unit 174 is configured to compare the language used in the textual content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 168 may vary from implementation to implementation. If one or more of these checks determines that the textual content includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the application that the request received by the request processing unit 122 could not be processed. The user interface provides information indicating why the blocked content notification was issued in some implementations. The user may attempt to refine the natural language prompt to remove the potentially offensive content. A technical benefit of this approach is that the moderation services 168 provides safeguards against both user-created and model-created content to ensure that prohibited offensive or potentially offensive content is not presented to the user in the native application 114 or the web application 190.

Figure 2:
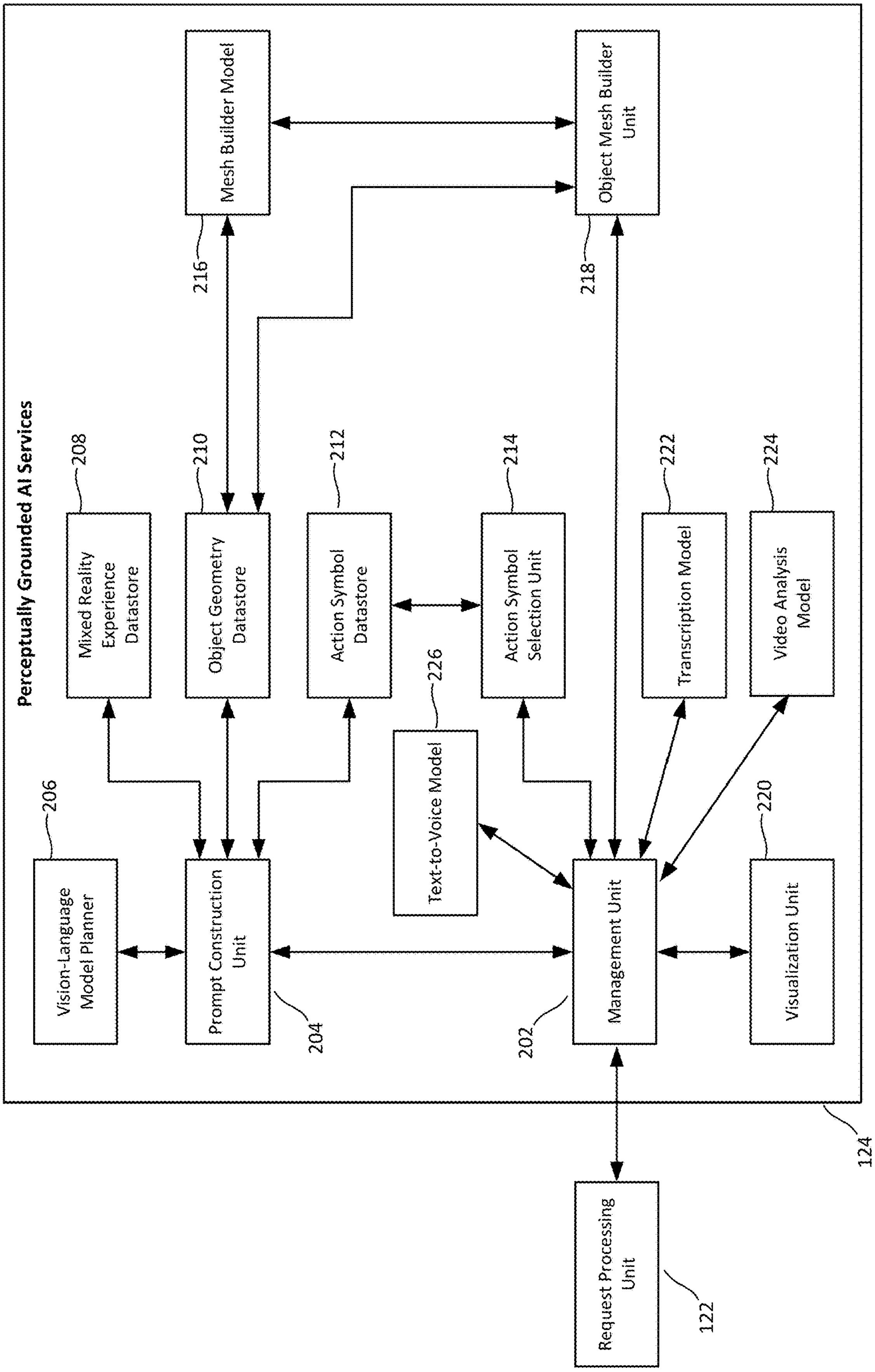
FIG. 2 is a diagram of an example implementation of the perceptually grounded artificial intelligence (AI) services shown in FIG. 1.

FIG. 2 is a diagram showing additional features of the perceptually grounded AI services 124 shown in FIG. 1. The perceptually grounded AI services 124 implement the spatially-semantically aware AI techniques provided herein. The perceptually grounded AI services 124 includes a management unit 202, a prompt construction unit 204, a vision-language model planner 206, a mixed reality experience datastore 208, an object geometry datastore 210, an action symbol datastore 212, an action symbol selection unit 214, a mesh builder model 216, an object mesh builder unit 218, a visualization unit 220, a transcription model 222, a video analysis model 224, and a text-to-voice model 226. The perceptually grounded AI services 124 collaborate with users to author new mixed reality content, such as but not limited to guides that teach users how to perform various types of tasks that include interaction with real-world and digital objects. The perceptually grounded AI services 124 also enables users to interact with the mixed reality content that has already been created.

The vision-language model planner 206 facilitates multi-modal mixed-reality collaborations that enable users to collaborate with a spatially-semantically aware generative language model create and/or consume mixed media content. The vision-language model planner uses the generative language model to provide spatially-semantically aware instructions to the user to execute various tasks. The vision-language model planner also interacts with, monitors, and supports the user with real-time guidance as they are performing these tasks. This support includes answering user questions about the physical objects and providing suggestions, corrections, and/or explanations to user that consider the state and context of the activity being performed.

The language model utilized by the vision-language model planner 206 is spatially-semantically aware. The vision-language model planner 206 receives prompts to generate various types of textual content that can be presented to users in a mixed reality environment and provides these prompts to the generative language model as an input. The language model being spatially-semantically aware means that the model has an understanding of the layout of the environment surrounding the user in the mixed reality environment, has an understanding of the shape and position of objects within the environment, and an understanding the spatial relationship the parts of complex multipart objects. The language model 206 is implemented using a large language model (LLM) in some implementations. Examples of such models include but are not limited to a Generative Pre-trained Transformer 3 (GPT-3), or GPT-4 model. Other implementations may utilize other models or other generative models. Furthermore, the models may be multimodal models in some implementations that are capable of receiving multiple types of inputs, such as but not limited to textual inputs, audio inputs, and video inputs, and analyzing these inputs to generate the textual content, audio content, video content, and/or other types of content that can be presented to the user.

The prompt construction unit 204 constructs prompts for the vision-language model planner 206 that includes information that describes objects in the environment, the position of these objects in the environment, and the relationships between these objects. For mixed reality experiences that demonstrate how to perform a particular task, the vision-language model planner 206 collaborates with the user to create a task list that identifies as set of subtasks to be performed, the object and/or object parts involved with each subtask, and action symbols that are presented to help users performing the tasks to better understand a particular action to be performed. The vision-language model planner 206 uses this task list to guide users through completing the task in a mixed reality experience. Additional details of how the mixed reality experiences are authored and presented to users are provided in the examples which follow. In some implementations, the task list comprises noun-verb pairs. The noun refers to the part of complex multipart object which is interacted with in a particular subtask, and the verb refers to the action to be performed on the part of the complex multipart object.

The mixed reality experience datastore 208 stores information associated with mixed reality experiences that have been authored in collaboration with the perceptually grounded AI services 124. The mixed reality experience datastore 208 stores information such as but not limited to prompts to the vision-language model planner 206 used to generate content, the task list or task lists associated with the mixed reality experiences, instruction manuals, expert narrations, and/or other information associated with the mixed reality experiences. The prompt construction unit 204 stores information in the mixed reality experience datastore 208 as requests to collaboratively author mixed reality experiences are generated and retrieves the relevant information from the mixed reality experience datastore 208 in response to the requests to present a previously created mixed reality experience.

The object geometry datastore 210 stores geometry and semantic information for the environment in which a mixed reality experience occurs, objects within the environment, and/or of the objects. The semantic information provides information that the vision language model planner 206 can use to understand the relationship between the semantic descriptors and their physical counterparts in the environment and/or on objects or parts of objects therein. The mixed reality experience information of the mixed reality experience datastore 208 references the geometry information in the object geometry datastore 210. The geometry information is used to generate digital representations of parts of the environment, the objects in the environment, and/or parts of the objects in the environment. The geometry information is used to generate digital representations of these elements that users can interact with in the mixed reality experience. The object mesh builder unit 218 guides users authoring a mixed reality experience through a process for creating geometric mesh models using the mesh builder model 216 as discussed in the examples which follow.

The action symbol datastore 212 provides stores action symbols that can be included in a mixed reality experience to provide additional context to a user regarding an action to be performed. The action symbols are positioned and oriented in the mixed experience environment to identify a particular object or object part on which an action associated with a task is to be performed and/or a representation of the action to be performed. In non-limiting example, the action symbols include an arrow that can be positioned to point to an object on which an action is to be performed and various symbols representing actions such as lifting, pulling, pushing, turning, and/or sliding an object. The action symbol datastore 212. Additional details of how the action symbols are selected and positioned in a mixed reality experience are discussed in the examples which follow. The actions associated with a particular mixed reality experience are selected by the action symbol selection unit 214 as discussed in the examples which follow.

The management unit 202 receives requests from the request processing unit 122 to collaborate with the spatially-semantically aware AI to author mixed reality content and/or consume mixed reality content that has already been created. The management unit 202 also coordinates communications and the exchange of data among the various components of the perceptually grounded AI services 124.

The object mesh builder unit 218 is used to generate a representation of the geometry of real-world objects and/or object parts. The object mesh builder unit 218 is invoked when a user is collaborating with the perceptually grounded AI services 124 to author mixed reality content that includes objects that are not yet associated with models in the object geometry datastore 210. The object mesh builder unit 218 builds a 3D mesh model of the objects. These models are used by the perceptually grounded AI services 124 to create digital representations of the real-world object or parts thereof that can be interacted with in a mixed reality experience. The object mesh builder unit 218 provides a user interface that enables users to capture multiple views of the object to be modeled. The views may be a series of still images or frames extracted from video. The object mesh builder unit 218 performs an interactive image segmentation to identify a particular object or object part to be modeled so that a mesh representation of that object can be generated. Additional details of this process are discussed with respect to FIG. 3C. The mesh models are generated by the mesh builder model 216 and stored in the object geometry datastore 210. The mesh builder model 216 is a machine learning model trained to analyze multiple images of an object or an object part and to generate a three-dimensional mesh that that is a 3D representation of the object or object part. Other techniques for generating the mesh for an object or object part may also be utilized in other implementations.

The visualization unit 220 generates a visualization of the mixed reality experience that can be presented on a display of the client device 105. The visualization unit 220 receives the content output by the vision-language model planner 206 which can include textual instructions to the user that may be displayed and/or converted to audio instructions, information indicating one or more digital objects from the object geometry datastore to be presented, and/or one or more actions symbols to be generated.

The transcription model 222 is a language model trained to receive audio input that includes spoken language and to output a textual transcript of the spoken language. The text-to-voice model 226 performs the reverse of this operation and generates spoken audio from a text. The text-to-voice model 226 is used to generate voice prompts from the output of the vision-language model planner 206.

FIG. 3A is a flow diagram of an example process 300 for collaborating with the spatially-semantically aware AI to create a mixed reality experience according to the techniques described herein. The process 300 can be implemented by the perceptually grounded AI services 124 shown in FIG. 2. The process 300 provides one example of how the perceptually grounded AI services 124 can collaborate with the user to author a new mixed reality experience. The mixed reality experience in this example is a mixed reality guide that shows a user how to perform task that includes a set of subtasks on a real-world object. The spatial-semantic awareness capability of the vision-language model planner 206 enables the perceptually grounded AI services 124 to create an interactive experience in which the user can interact with real-world objects and digital objects to perform a specified task.

The process 300 includes an operation 302 of prompting the user to provide a description of one or more subtasks of a task and an operation 304 of obtaining a description of each of the subtasks from the user. The management unit 202 can prompt the user to provide a description of the subtasks in response to receiving a request to create a new mixed reality experience from the native application 114 or the web application 190. The request may include a natural language prompt that was input by the user that describes the task to be performed. The management unit provides the natural language prompt to the prompt construction unit 204, and the prompt construction unit 204 formats the natural language prompt into a format that is recognized by the vision-language model planner 206. In some implementations, the user provides a set of written instructions. The user may provide these instructions with the natural language prompt. In other implementations, the vision-language model planner 206 generates a set of textual prompts that guides the user through describing each of the subtasks associated with the task. The visualization unit 220 presents the questions as texts on a user interface of the client device 105 and/or as spoken queries that are output by an audio output of the client device 105. The user may input textual responses and/or provide spoken responses that are analyzed by an audio-to-text language model that transcribes the user responses.

The process 300 includes an operation 306 of prompting the user to collaborate with the vision-language model planner 206 to generate a 3D representation of an object or object part associated with each subtask and to annotate these objects and/or object parts. The 3D representation of the object and/or object parts is created by capturing a series of two-dimensional (2D) images of the objects which are used to generate the 3D representation of the object and/or the object parts. This process includes prompting the user to provide annotations that identify the objects and the object parts. These annotations are later used by the vision-language model planner 206 to guide through performing the task during the execution of the mixed reality experience. In implementations in which the client device 105 is a mixed reality headset, the management unit 202 prompts the user to capture images of the objects and/or object parts that are to be included in the mixed reality experience using a camera of the device. The management unit 202 provides the images and/or video captured by the mixed reality headset to the object mesh builder unit 218 to construct a 3D representation of the object. The mesh builder unit 218 guides the user through the process of identifying objects in the environment and/or object parts. The user can point to the object or object part for identifying them. The mesh builder unit 218 may also use eye tracking and/or other means of receiving user inputs to identify the objects and/or object parts. Additional details of how the 3D representation may be generated is discussed with respect to FIG. 3C. The 3D representation of the object and/or object parts is stored in the object geometry datastore 210.

The process 300 includes an operation 308 of prompting the user to demonstrate each of the subtasks. The user is prompted to perform each of the subtasks so that the mixed reality headset or other client device 105 of the user can capture video of the user performing each of the subtasks. The video is analyzed using the video analysis model 224 to identify which object parts are involved with each of the subtasks. The video analysis model 224 is provided the object geometry for the objects associated with the mixed reality experience from the object geometry datastore 210 so that the video analysis model 224 can determine which objects or object parts involved with each subtask. The video is also analyzed to identify the motions taken by the user when interacting with the object or object parts to identify the actions taken by the user. FIG. 3D shows an example process for analyzing these user actions to identify the actions performed and to include action symbols representing these actions in the mixed reality experience. The action symbol selection unit 214 determines an appropriate action symbol to associate with each action and stores an indication of the selected symbols in the action symbol datastore 212.

The process 300 includes an operation 310 of prompting the vision-language model planner 206 to generate a task list. The management unit 202 requests that the prompt construction unit 204 construct a prompt to the vision-language model planner 206 to generate a task list for the mixed reality experience. The task list includes each of the subtasks that are part of the overall task to be performed. The task list also includes an object or object part that is associated with each subtask, the location of the object subpart (where applicable), and the region of the object in which the interaction between the user and the object takes place. The prompt construction unit 204 utilizes a prompt template to construct the prompt in some implementations. An example of such a prompt template is provided in FIG. 5A, and an example of a task list is provided in FIG. 5B.

The process 300 includes an operation 312 of storing mixed reality experience information in the mixed reality experience datastore 208. The task list and/or other information associated with the mixed reality experience is then stored in the mixed reality experience datastore 208.

FIG. 3B is a flow diagram of an example process 320 for using spatially-semantically aware AI to present a mixed reality experience according to the techniques described herein. The process 320 can be implemented by the perceptually grounded AI services 124 to present an existing mixed reality experience to a user. The user may select from among a set of existing mixed reality experiences included in the mixed reality experience datastore 208 on a user interface of their client device 105. As discussed in the preceding examples, the client device 105 is a mixed reality headset in some implementations, but other form factors are also possible in other implementations. Selecting the mixed reality experience causes the mixed reality application 118 to activate the camera of the client device to begin capturing video of the environment. The video content is overlaid with digital content generated by the perceptually grounded AI services 124. In the example process 320, the mixed reality experience is a guide for performing a task that includes a plurality of subtasks. However, the techniques herein can be used to implement other types of mixed reality experiences.

The process 320 includes an operation 322 in which the management unit 202 instructs the prompt construction unit 204 to access the mixed reality experience datastore and obtain the task list associated with the mixed reality experience. The prompt construction unit 204 accesses the information used to construct the prompt from the mixed reality experience datastore 208, the object geometry datastore 210, and/or the action symbol datastore 212.

The prompt construction unit 204 constructs a prompt for the vision-language model planner 206 instructing the vision-language model planner 206 to initiate the mixed reality experience. The prompt construction unit 204 constructs the prompt based on the task list associated with the mixed reality experience. The prompt causes the vision-language model planner 206 begin generating content for the mixed reality experience that will be provided to the visualization unit 220 and/or the text-to-voice model 226 to generate audiovisual content that is presented to the user on a user interface of the client device 105. The vision-language model planner 206 generates introductory content that provides context to the user for the task that is to be performed in some implementations. The vision-language model planner 206 may then begin stepping through the task list and prompting the user to perform each of the subtasks described therein. The instructions can include instructions to the visualization unit 220 to highlight the object or object part that is associated with the current subtask and/or to present action symbols associated with an action to be taken by the user for the subtask. The visualization unit 220 uses the geometric models included in the object geometry datastore 210 to generate a digital overlay over a specific object or object part. The visualization unit 220 determines the position and orientation of the real-world object or object part and uses this information to determine the position, orientation, and scaling of the digital overlay.

The client device 105 provide video, audio, and/or user inputs from the client device 105, which are then analyzed by the management unit 202 to using the video analysis model 224, the transcription model 222, and/or other functionality to determine the actions that the user is performing in response to the instructions output by the vision-language model planner 206. The management unit 202 provides the information associated with the user response to the prompt construction unit 204 which constructs a prompt to the vision-language model planner 206 that indicates the actions that the user has taken in response to the previous prompt in operation 326. The management unit 202 then causes the prompt construction unit 204 to construct further prompts to update the state of the mixed reality experience in operation 328. The vision-language model planner 206 analyzes the actions taken by the user to determine whether the user has completed the subtask as instructed. If the subtask has not been completed successfully, the vision-language model planner 206 can repeat the instructions and/or elaborate on the instructions provided to the user and the visualization unit 220 then presents the follow up instructions to the user. If the subtask has been completed successfully, the vision-language model planner 206 can then generate instructions to the user for completing the next subtask in the task list if any subtasks have not yet been completed.

Figure 3C:
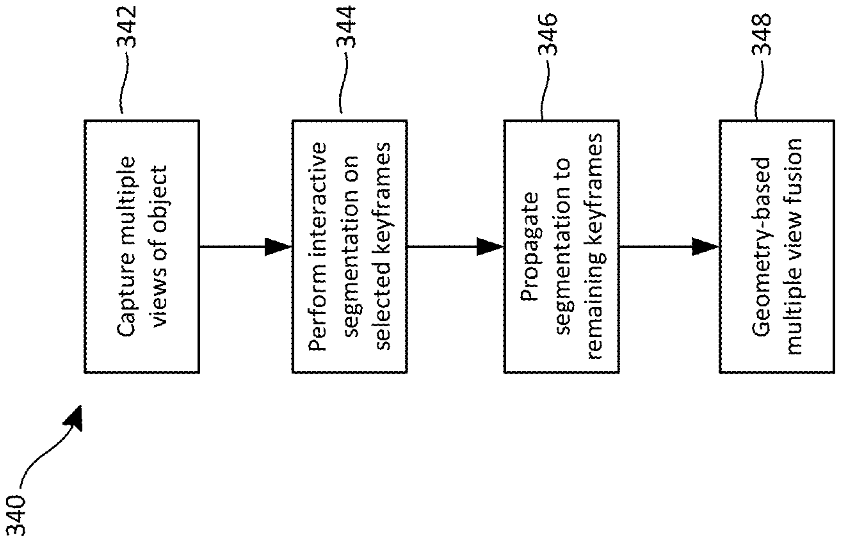
FIG. 3C is a flow diagram of an example process for generating a 3D representation of an object according to the techniques described herein.
Figure 3D:
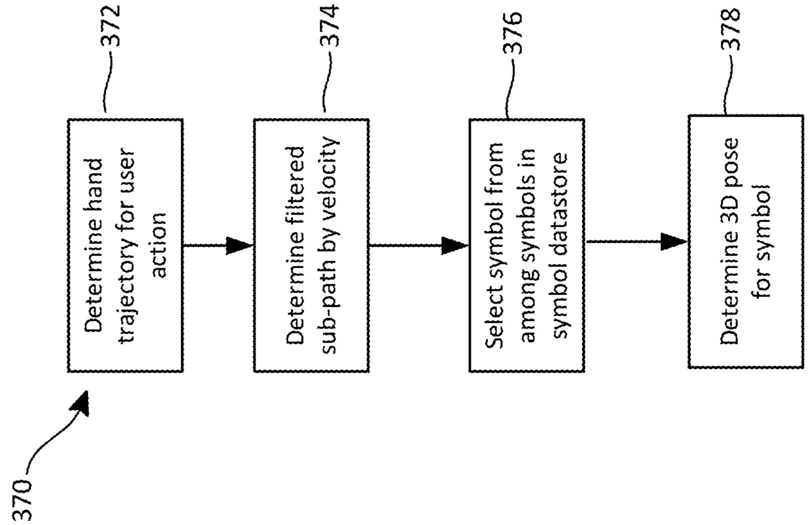
FIG. 3D is a flow diagram of an example process for determining the pose of an action symbol according to the techniques described herein.

FIG. 3C is a flow diagram of an example process 340 for generating a 3D representation of an object according to the techniques described herein. The process 340 can be implemented by the object mesh builder unit 218 of the perceptually grounded AI services 124.

The process 340 includes an operation 342 of capturing multiple views of the object. The object mesh builder unit 218 can prompt the user to capture multiple views of the object from different angles using the camera of their mixed media headset or other client device 105. The object mesh builder unit 218 provides the prompts to the management unit 202. The management unit 202 provides the prompts to the request processing unit 122 to provide to the mixed reality application 118, the native application 114, and/or the web application 190. The mixed reality application 1118, the native application 114, or the web application 190 presents the prompts to the user on a user interface of the client device as textual and/or audio prompts.

The process 340 includes an operation 344 of performing an interactive segmentation on selected keyframes of the video of the operation captured in operation 342. The segmentation operation separates the object into multiple parts which the user may interact with in the mixed reality experience being created. In a non-limiting example, a coffee maker may be segmented into a water reservoir, a lid for the water reservoir, a drip tray, a power button, a brew button, a coffee capsule receptacle, a level for opening the coffee capsule receptacle, and/or other parts. In the interactive segmentation stage, the user can point to, touch, verbally describe, look at, or otherwise identify a part of the object. The user can provide a spoken or typed description of the object. The interactive segmentation process may present the user with multiple candidate representations of the selected object part in instances in which the mesh builder model 216 is not certain of the boundaries of the object part. These candidates may be presented to the user as a digital overlay on the object part on the user interface of the client device so that the user can select a particular candidate object. A candidate object part can be selected for multiple sets of keyframes of the video content.

The process 340 includes an operation 346 of propagating the segmentation across the remaining keyframes so that views of the object part can be generated from multiple angles to create a more complete 3D mesh representation of the object part. The object mesh builder unit 218 utilizes the mesh builder model 216 to propagate the segmentation across the remaining keyframes.

The process 340 includes an operation 348 of performing a geometry-based multiple view fusion of the multiple views of the object to create a single 3D mesh representation of the object. The object mesh builder unit 218 then saves the 3d mesh representation of the object in the object geometry datastore 210.

FIG. 3D is a flow diagram of an example process 370 for determining the pose of an action symbol according to the techniques described herein. As discussed in the preceding examples, the perceptually grounded AI services 124 can include action symbols in the mixed reality experience to help users performing the tasks to better understand a particular action to be performed. The process 370 can be performed by the action symbol selection unit 214. Some actions performed by the user may not have an associated action symbol. In such instances, no action symbol is presented for that particular user action.

The process 370 includes an operation 372 of determining a hand trajectory for user action. For each action that is performed by the user for a subtask, the trajectory of the user's hand is tracked in the video captured of the user performing the subtask. The video analysis model 224 analyzes the video and output the hand trajectory in some implementations.

The process 370 includes an operation 374 of determining a filtered sub-path by velocity. Changes in velocity of the user's hand are indicative of the beginning and/or end of the user action. The trajectory filtered accordingly to include just motion that is likely to be associated with the user action.

The process 370 includes an operation 376 of selecting an action symbol from among the action symbols in the action symbol datastore 212. The action symbol selection unit 214 compares the path of the user's hand with the expected paths associated with the action symbols in the action symbol datastore 212 to select an action symbol that for which the expected trajectory associated with the symbol best matches the hand trajectory determined in operations 372 and 374. Some user actions may not be associated with an action symbol, and the action symbol selection unit 214 only selects an action symbol if the expected trajectory associated with the action symbol that was a best match exceeds a minimum matching threshold.

The process 370 includes an operation 378 of determining a 3d pose for the selected symbol. An orientation of the selected action symbol is determined based on the trajectory information. A technical benefit of this approach is that the selected action symbol is automatically orientated and positioned correctly with respect to the object part on which the user action is to be performed. This orientation and position are automatically maintained as the user's view of the object changes. The action symbols associated with a particular subtask and object are stored in the action symbol datastore 212 and the action symbol information is retrieved when the visualization of the mixed reality experience is generated when a user executes the mixed reality experience.

Figure 4:
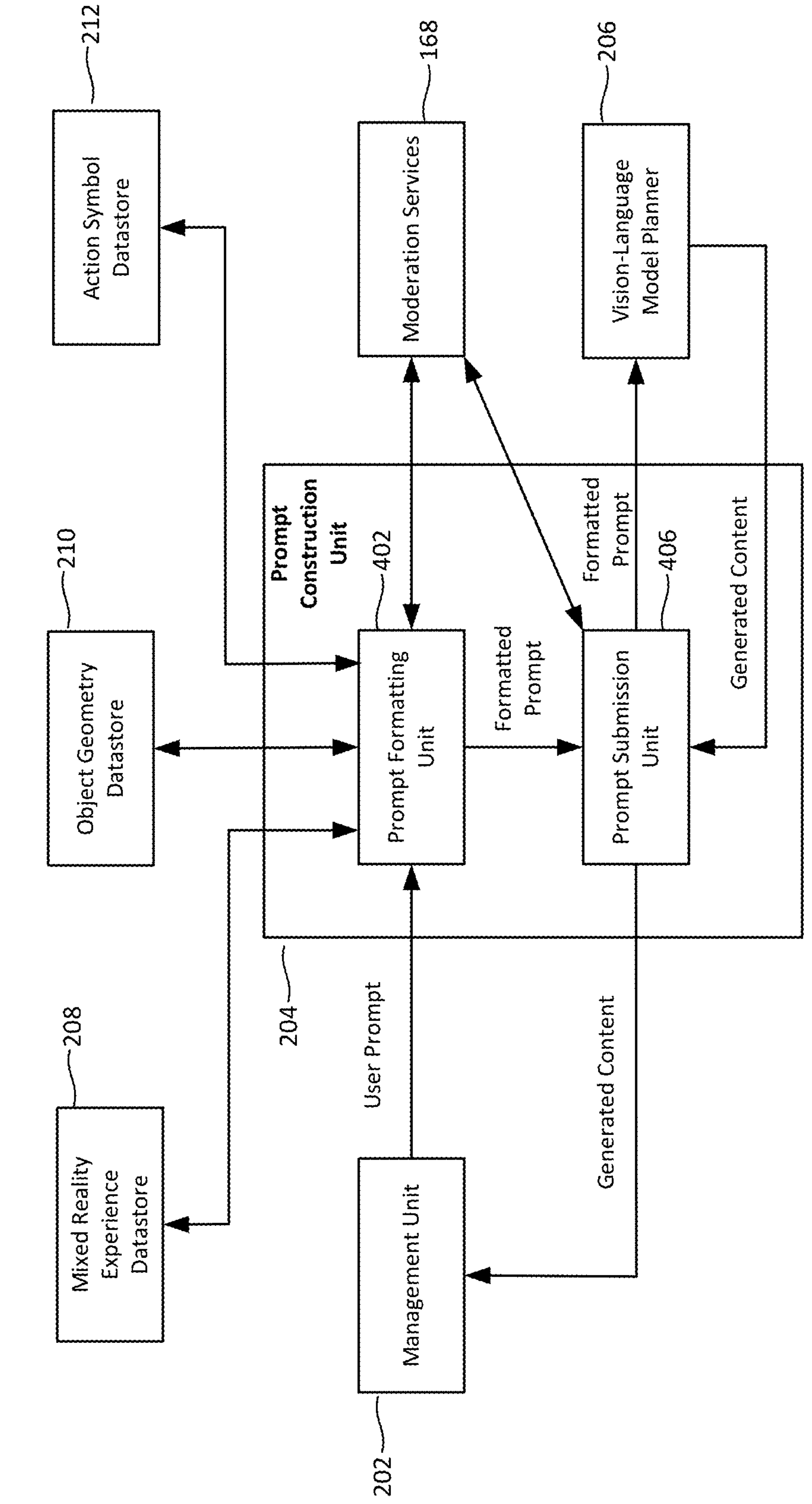
FIG. 4 is a diagram showing additional features of the prompt construction unit of the perceptually grounded AI services shown in FIG. 2.

FIG. 4 is a diagram showing additional features of the prompt construction unit 204 of the application services platform shown in FIG. 1. The prompt construction unit formats the prompt for the vision-language model planner 206 and submits the prompt to the vision-language model planner 206. The prompt construction unit 204 includes a prompt formatting unit 402 and a prompt submission unit 406.

The prompt construction unit 204 can receive a natural language prompt input by a user collaborating with the vision-language model planner 206 to author a mixed reality experience and/or interact with an existing mixed reality experience. The prompt construction unit 204 may access a template, such as the template shown in FIG. 5A to generate the task list or a template to generate other content for the mixed reality experience. The prompt construction unit 204 can include information from the mixed reality experience datastore 208, the object geometry datastore 210, and/or the action symbol datastore 212 depending upon the type of prompt being provided to the vision-language model planner 206. The types of prompts can include prompts to cause the model to generate content to be presented to the user when authoring content and prompts to cause the model to generate content guide the user through an interactive guide. The specific format of the prompt may differ from implementation to implementation.

The prompt construction unit 204 submits the formatted prompt to the moderation services 168 to ensure that the prompt does not include any potentially objectionable or offensive content. The prompt construction unit 204 halts the processing of the prompt in response to the moderation services 168 determining that the prompt includes potentially objectionable or offensive content. As discussed in the preceding examples, the moderation services 168 generates a blocked content notification in response to determining that the prompt includes potentially objectionable or offensive content, and the notification is provided to the native application 114 or the web application 190 so that the notification can be presented to the user on the client device 105. The user may attempt to revise and resubmit the natural language prompt.

The prompt submission unit 406 submits the formatted prompt to the vision-language model planner 206. The vision-language model planner 206 analyzes the prompt and generates a response based on the prompt. The prompt submission unit 406 submits the response generated by the language model to the moderation services 168 to ensure that the response does not include any potentially objectionable or offensive content. The prompt construction unit 204 halts the processing of the response in response to the moderation services 168 determining that the prompt includes potentially objectionable or offensive content. The moderation services 168 generates a blocked content notification in response to determining that the generated content includes potentially objectionable or offensive content, and the notification is provided to the native application 114 or the web application 190 so that the notification can be presented to the user on the client device 105. The user may attempt to revise and resubmit the natural language prompt. If the moderation services 168 does not identify any issues with the generated content output by the vision-language model planner 206 in response to the prompt, the prompt submission unit 406 provides the generated output to the management unit 202. The management unit 202 the provides the generated content to the request processing unit 122, which may then provide the content to the visualization unit 220 to generate a visualization of the content for the client device 105.

FIG. 5A is an example of a prompt template that may be used by the prompt construction unit 204 of the perceptually grounded AI services 124. The sample template is used to generate a task list, such as the task list shown in FIG. 5B. The task list includes a list of the subtasks to be performed to complete a particular task, the user actions associated with the subtasks, and the associated objects and/or object parts. The template includes instructions to the vision-language model planner 206 regarding what content is to be generated and rules associated with generating the content. The template in this example also includes an instruction manual that is associated with the task to be performed. Additional information such as this may be provided with a request to author a new mixed reality experience. Otherwise, if such additional information is unavailable, the context information is left blank.

FIG. 5B is an example of a task list that may be generated by the vision-language model planner 206 based on the prompt shown in FIG. 5B. The task list provides a list of the subtasks that are part of the task to be performed in sequential order. Each subtask is associated with an object, a user action to be performed on that object, and other information associated with the subtask. The task list may also identify the action symbols to associate with a particular action in some implementations. The information included in the task list may vary from implementation to implementation and is not limited to the specific example shown in FIG. 5B. In some implementations, the task list comprise noun-verb pairs. The noun refers to the part of complex multipart object which is interacted with in a particular subtask, and the verb refers to the action to be performed on the part of the complex multipart object. The management unit 202 and the vision-language model planner 206 use the task list to manage the execution of the interactive mixed media experience when presenting the mixed media experience to users.

FIG. 6A is a flow chart of an example process 600 for generating content using a spatially-semantically aware language model according to the techniques disclosed herein. The process 600 can be implemented by the perceptually grounded AI services 124 shown in the preceding examples.

The process 600 includes an operation 602 of receiving a first request from a client device of a user for creating a mixed-reality experience associated with performing a task on a complex multipart object. As discussed in the preceding examples, the request may be from the client device of a user to collaboratively author a mixed reality experience with the vision-language model planner. The mixed reality experience is an interactive guide for performing a task involving a complex multipart object. However, the techniques herein are not limited to interactive guides.

The process 600 includes an operation 604 of obtaining three-dimensional object geometry information for the complex multipart object. As discussed in the preceding examples, the object mesh builder 218 provides an interactive segmentation process for building 3D mesh representations of the object and/or object parts. The 3D representations are stored in the object geometry datastore 210.

The process 600 includes an operation 606 of obtaining a description of the task to be performed including a plurality of subtasks each associated with a user action to be performed on a respective part of the complex multipart object. As discussed in the preceding examples, the management unit 202 and the vision-language model planner 206 can generate a series of prompts to that request the user to provide a description of the task and the subtasks associated with the task. The vision-language model planner 206 can generate a series of queries that are presented to the user that requests that the user provide a description of each of the subtasks and to demonstrate any user actions associated with the subtasks.

The process 600 includes an operation 608 of constructing a prompt to the vision-language model planner using a prompt construction unit 204. The prompt instructing the vision-language model planner to generate a task list based on the three-dimensional object geometry information and the description of the task to be performed. As discussed in the preceding examples, the prompt construction unit 204 constructs a prompt using a template, such as the template shown in FIG. 5A, that instructs the vision-language model planner 206 to generate the task list that can later be used to implement the mixed reality experience.

The process 600 includes an operation 610 of providing the prompt as an input to the vision-language model planner and an operation 612 of obtaining the task list from the vision-language model planner. The prompt construction unit 204 provides the prompt as an input to the vision-language model planner 206 to obtain the task list.

The process 600 includes an operation 614 of generating content for the mixed reality experience using the task list in response to a second request to execute the mixed reality experience. As discussed in the preceding examples, the prompt construction unit 204 of the perceptually grounded AI services 124 generates a prompt or series of prompts based on the task list generate content for the mixed reality experience in response to a receiving a user request to access the mixed reality experience.

Figure 6B:
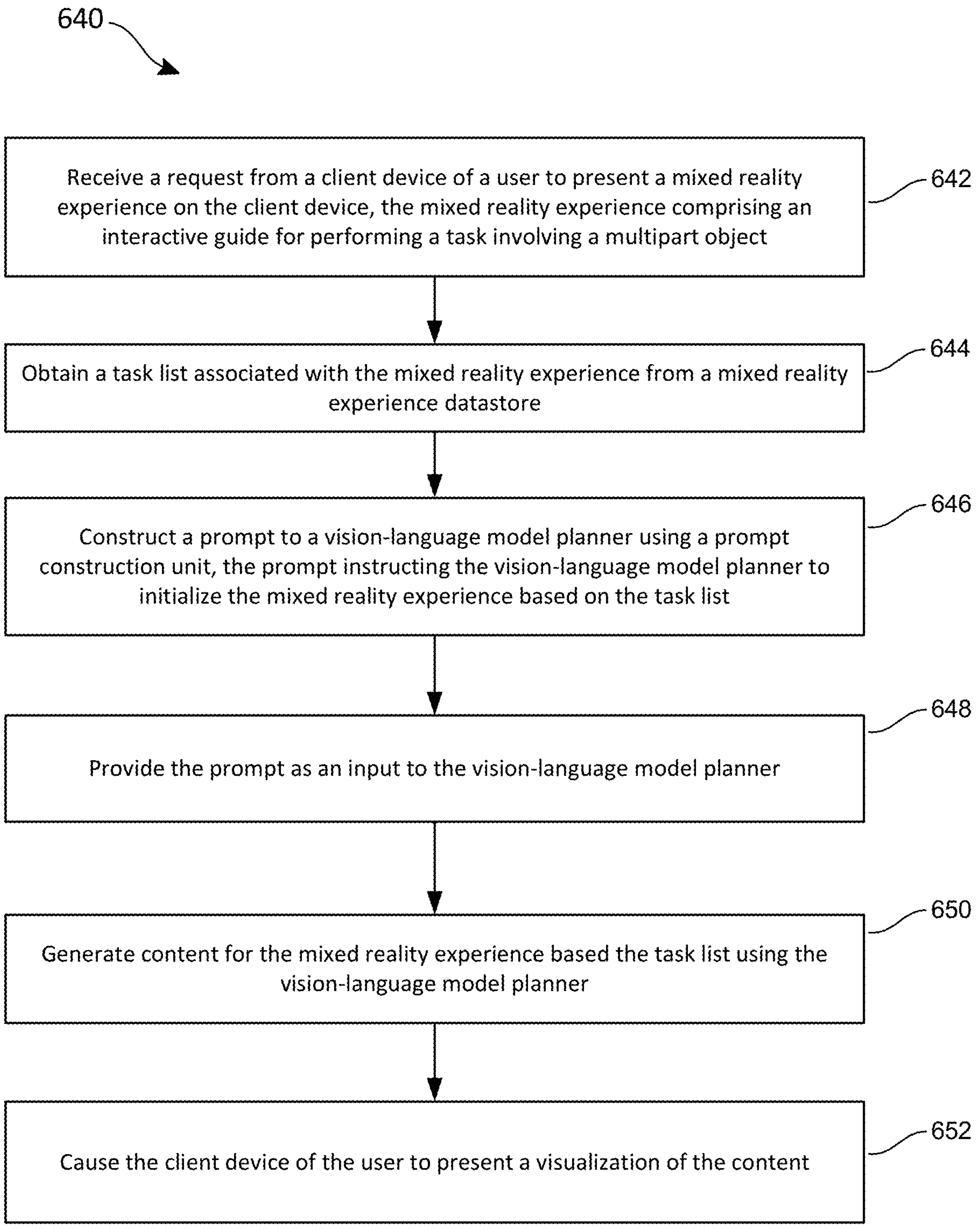
FIG. 6B is a flow chart of another example process for generating content using a spatially aware language model according to the techniques disclosed herein.

FIG. 6B is a flow chart of another example process 640 for generating content using a spatially-semantically aware language model according to the techniques disclosed herein. The process 640 can be implemented by the perceptually grounded AI services 124 shown in the preceding examples.

The process 640 includes an operation 642 of receiving a request from a client device 105 of a user to present a mixed reality experience on the client device. The mixed reality experience is an interactive guide for performing a task involving a complex multipart object. As discussed in the preceding examples, users can access the mixed reality experiences authored according to the techniques herein to provide an interactive guide to perform various types of tasks.

The process 640 includes an operation 644 of obtaining a task list associated with the mixed reality experience from a mixed reality experience datastore. The management unit 202 causes the prompt construction unit 204 to load the task list associated with the mixed reality experience from the mixed reality experience datastore 208 as discussed in the preceding examples.

The process 640 includes an operation 646 of constructing a prompt to a vision-language model planner using a prompt construction unit and an operation 648 of providing the prompt as an input to the vision-language model planner. As discussed in the preceding examples, the prompt instructs the vision-language model planner to initialize the mixed reality experience based on the task list.

The process 640 includes an operation 650 of generating content for the mixed reality experience based the task list using the vision-language model planner. The vision-language model planner 206 generates content for the mixed reality experience, including content guiding the user through performing each of the subtasks of the task. The content includes digital overlays of objects and/or object parts to emphasize the particular object or object part that is associated with a particular task. A technical benefit of this approach is that the vision-language model planner 206 can understand how the user can interact with objects within the scene and the vision-language model planner 206 can provide guidance to the user for performing each of the subtasks and feedback if the user does not correctly perform a user action associated with the subtask. Current language models lack such spatial-semantic awareness and cannot provide such guidance or may hallucinate incorrect guidance or feedback.

The process 640 includes an operation 652 of causing the client device of the user to present a visualization of the content. The visualization unit 220 can generate visualizations of the content generated by the vision-language model planner 206.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
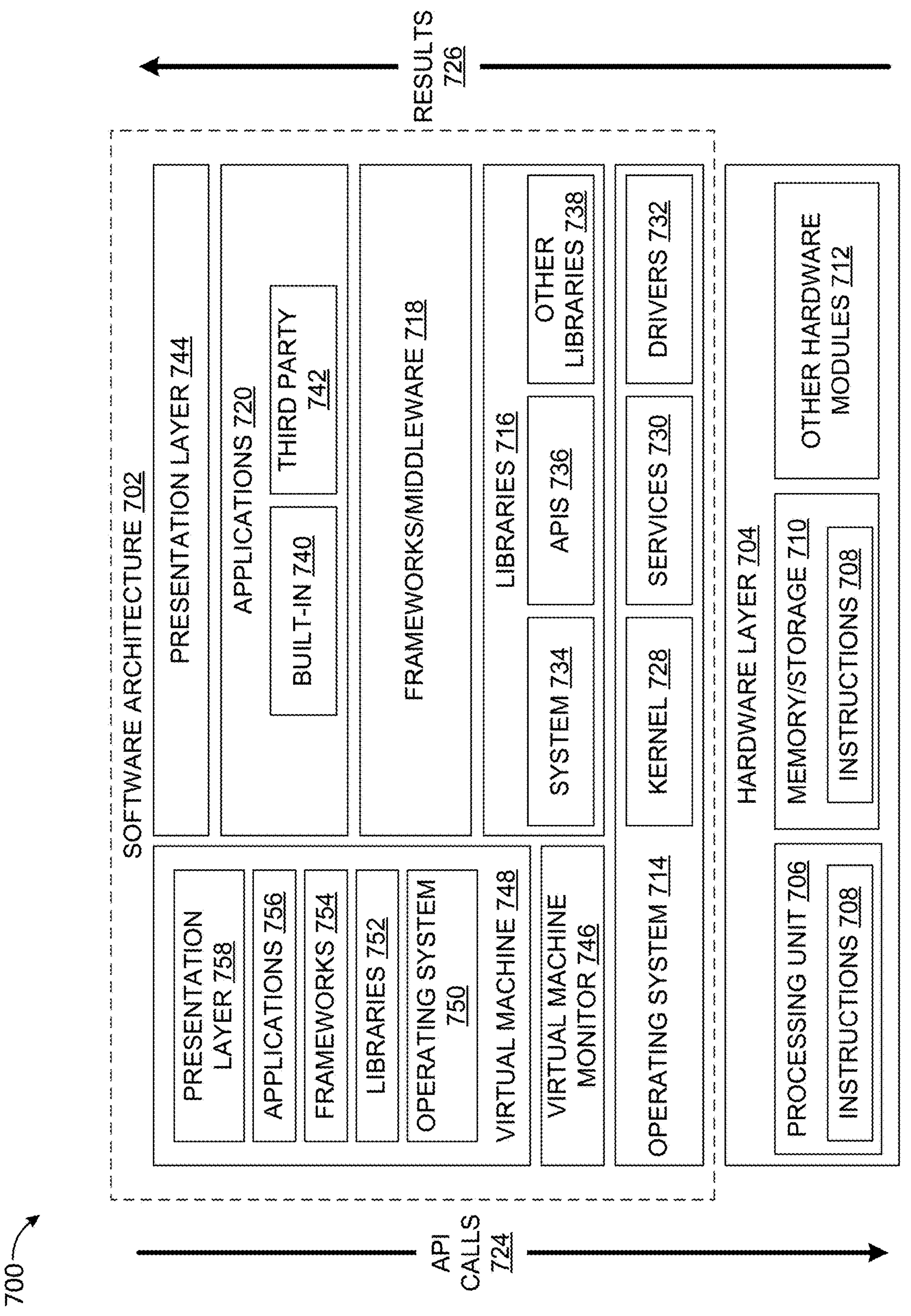
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/ modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
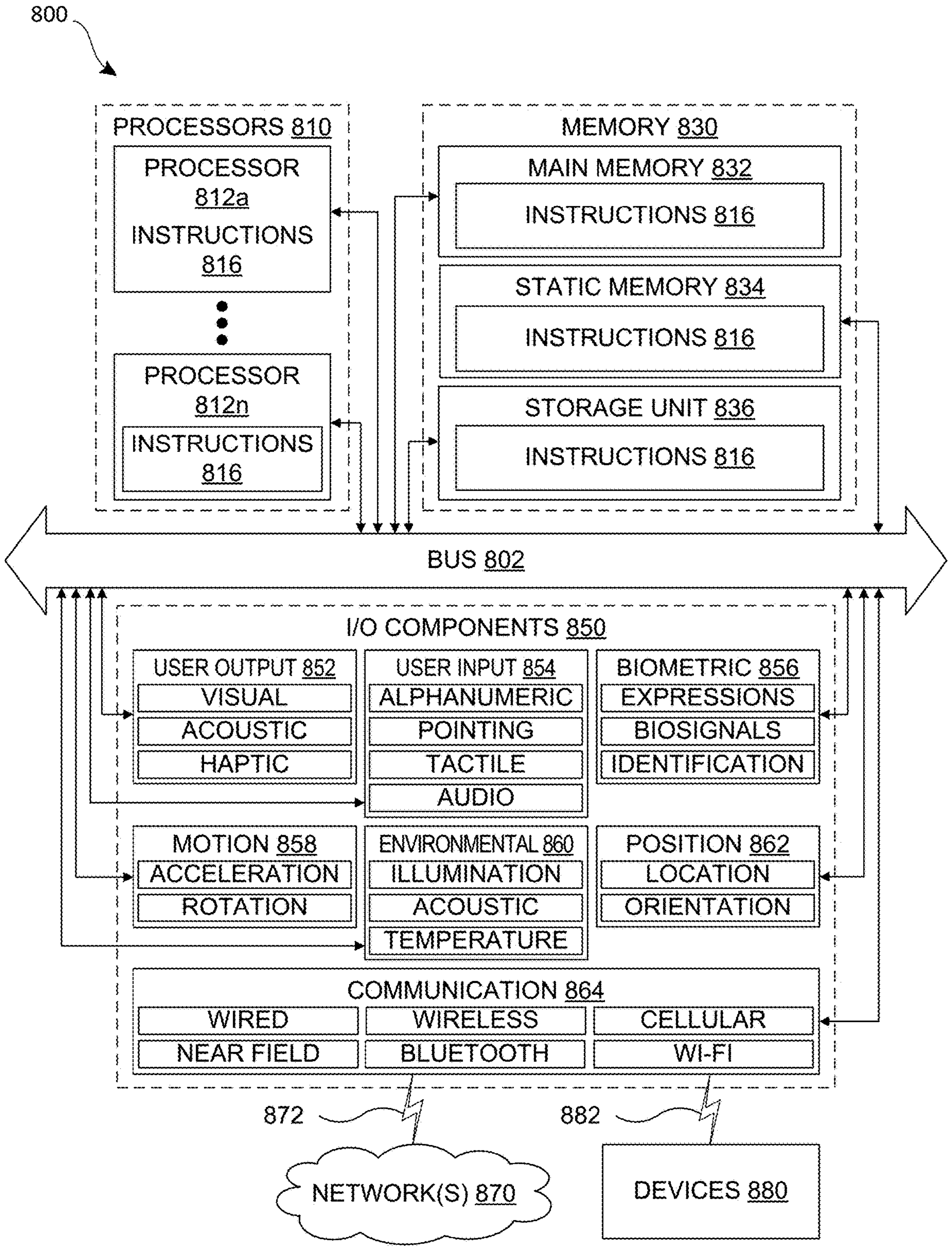
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
- a processor; and
- a machine-readable storage medium storing executable instructions that, when executed, cause the processor alone or in combination with other processors to perform operations of:
  - receiving a first request from a client device of a user for creating a mixed-reality experience associated with performing a task on a complex multipart object;
  - obtaining three-dimensional object geometry information for the complex multipart object by:
    - capturing multiple views of an object part of the complex multipart object in a plurality of keyframes;
    - performing an interactive segmentation process on selected keyframes of the plurality of keyframes to segment the object part from a remainder of the complex multipart object;
    - propagating segmentation to a remainder of the plurality of keyframes to generate multiple three-dimensional representations of the object part; and
    - fusing the multiple three-dimensional representations of the object part into a single three-dimensional representation of the object part;
  - obtaining a description of the task to be performed including a plurality of subtasks each associated with a user action to be performed on a respective part of the complex multipart object;
  - constructing a prompt to a vision-language model planner using a prompt construction unit, the prompt instructing the vision-language model planner to generate a task list based on the three-dimensional object geometry information and the description of the task to be performed;
  - providing the prompt as an input to the vision-language model planner;
  - obtaining the task list from the vision-language model planner; and
  - generating content for the mixed-reality experience using the task list in response to a second request to execute the mixed-reality experience.

2. The data processing system of claim 1, wherein the vision-language model planner is a large language model (LLM).

3. The data processing system of claim 1, wherein constructing the prompt further comprises:
- accessing a prompt template that provides instructions to the vision-language model planner; and
- updating the prompt template based on the three-dimensional object geometry information and the description of the task to be performed.

4. The data processing system of claim 1, wherein the task list comprises a list of subtasks associated with the task, a user action to be performed for each subtask, and an object part on which the user action is to be performed.

5. A data processing system comprising:
- a processor; and
- a machine-readable storage medium storing executable instructions that, when executed, cause the processor alone or in combination with other processors to perform operations of:
  - receiving a first request from a client device of a user for creating a mixed-reality experience associated with performing a task on a complex multipart object;
  - obtaining three-dimensional object geometry information for the complex multipart object;
  - obtaining a description of the task to be performed including a plurality of subtasks each associated with a user action to be performed on a respective part of the complex multipart object;
    - constructing a prompt for a vision-language model planner to cause the vision-language model planner to generate a series of queries to the user to provide a description of each subtask of the plurality of subtasks;
    - causing the client device of the user to present the series of queries to the user in a mixed reality environment;
    - receiving audio content from the client device of the user that include a spoken response to the series of queries; and
    - providing the audio content to a transcription model to generate a textual transcript of the spoken response to the series of queries;
  - constructing a prompt to the vision-language model planner using a prompt construction unit, the prompt instructing the vision-language model planner to generate a task list based on the three-dimensional object geometry information and the description of the task to be performed, the task list comprising a list of the plurality of subtasks associated with the task, a user action to be performed for each subtask, and an object part on which the user action is to be performed;
  - providing the prompt as an input to a vision-language model planner;
  - obtaining the task list from the vision-language model planner; and
  - generating content for a mixed reality experience using the task list in response to a second request to execute the mixed reality experience.

6. The data processing system of claim 5, wherein obtaining the three-dimensional object geometry information for the complex multipart object further comprises:
- capturing multiple views of an object part of the complex multipart object in a plurality of keyframes;
- performing an interactive segmentation process on selected keyframes of the plurality of keyframes to segment the object part from the rest a remainder of the complex multipart object;
- propagating segmentation to a remainder of the plurality of keyframes to generate multiple three-dimensional representations of the object part; and
- fusing the multiple three-dimensional representations of the object part into single three-dimensional representation of the object part.

7. A data processing system comprising:

a processor; and a machine-readable storage medium storing executable instructions that, when executed, cause the processor alone or in combination with other processors to perform operations of:

receiving a first request from a client device of a user for creating a mixed-reality experience associated with performing a task on a complex multipart object;

obtaining three-dimensional object geometry information for the complex multipart object;

obtaining a description of the task to be performed including a plurality of subtasks each associated with a user action to be performed on a respective part of the complex multipart object;

constructing a prompt to a vision-language model planner using a prompt construction unit, the prompt instructing the vision-language model planner to generate a task list based on the three-dimensional object geometry information and the description of the task to be performed;

providing the prompt as an input to the vision-language model planner;

obtaining the task list from the vision-language model planner;

generating content for the mixed-reality experience using the task list in response to a second request to execute the mixed-reality experience;

constructing a prompt for the vision-language model planner to cause the vision-language model planner to generate a series of queries to the user to demonstrate each subtask of the plurality of subtasks;

causing the client device of the user to present the series of queries to the user in a mixed reality environment;

receiving video content from the client device of the user that include demonstrations of the user performing each subtask of the plurality of subtasks in response to the series of queries; and analyzing the video content using a video analysis model to identify a user action performed for each subtask of the plurality of subtasks.

8. The data processing system of claim 7, wherein analyzing the video content using the video analysis model further comprises:

selecting an action symbol representing the user action performed for each subtask of the plurality of subtasks, the action symbol providing a visual representation of the user action to be performed.

9. The data processing system of claim 8, wherein the machine-readable storage medium further includes instructions configured to cause the processor alone or in combination with other processors to perform operations of:

detecting a hand trajectory of a hand of the user for each subtask of the plurality of subtasks; and determining the user action performed for each subtask of the plurality of subtasks based on the hand trajectory.

10. The data processing system of claim 9, wherein the machine-readable storage medium further includes instructions configured to cause the processor alone or in combination with other processors to perform operations of:

determining a pose for the action symbol for each subtask of the plurality of subtasks based on the hand trajectory associated with each subtask.

11. A method implemented in a data processing system for creating a mixed reality experience, the method comprising:

receiving a first request from a client device of a user for creating a mixed-reality experience associated with performing a task on a complex multipart object;

obtaining three-dimensional object geometry information for the complex multipart object by:

capturing multiple views of an object part of the complex multipart object in a plurality of keyframes;

performing an interactive segmentation process on selected keyframes of the plurality of keyframes to segment the object part from a remainder of the complex multipart object;

propagating segmentation to a remainder of the plurality of keyframes to generate multiple three-dimensional representations of the object part; and fusing the multiple three-dimensional representations of the object part into a single three-dimensional representation of the object part;

obtaining a description of the task to be performed including a plurality of subtasks each associated with a user action to be performed on a respective part of the complex multipart object;

constructing a prompt to a vision-language model planner using a prompt construction unit, the prompt instructing the vision-language model planner to generate a task list based on the three-dimensional object geometry information and the description of the task to be performed;

providing the prompt as an input to the vision-language model planner;

obtaining the task list from the vision-language model planner; and generating content for the mixed reality experience using the task list in response to a second request to execute the mixed reality experience.

12. The method of claim 11, wherein the vision-language model planner is a large language model (LLM).

13. The method of claim 11, wherein constructing the prompt further comprises:

accessing a prompt template that provides instructions to the vision-language model planner; and updating the prompt template based on the three-dimensional object geometry information and the description of the task to be performed.

14. The method of claim 11, wherein the task list comprises a plurality of subtasks associated with the task, a user action to be performed for each subtask, and an object part on which the user action is to be performed.

15. A data processing system comprising:

a processor; and a machine-readable storage medium storing executable instructions that, when executed, cause the processor alone or in combination with other processors to perform operations of:

receiving a request from a client device of a user to present a mixed reality experience on the client device, the mixed reality experience comprising an interactive guide for performing a task involving a complex multipart object, the interactive guide comprising a plurality of subtasks to be performed by the user;

obtaining a task list associated with the mixed reality experience from a mixed reality experience datastore;

constructing a prompt to a vision-language model planner using a prompt construction unit, the prompt instructing the vision-language model planner to initialize the mixed reality experience based on the task list and to generate a series of queries to the user to demonstrate each subtask of the plurality of subtasks;

providing the prompt as an input to the vision-language model planner;

generating content for the mixed reality experience based on the task list using the vision-language model planner;

causing the client device of the user to present a visualization of the content including causing the client device of the user to present the series of queries to the user in a mixed reality environment;

receiving video content from the client device of the user that include demonstrations of the user performing each subtask of the plurality of subtasks in response to the series of queries; and analyzing the video content using a video analysis model to identify a user action performed for each subtask of the plurality of subtasks.

16. The data processing system of claim 15, wherein the vision-language model planner is a large language model (LLM).

17. The data processing system of claim 15, wherein the task list comprises a list of subtasks associated with the task, a user action to be performed for each subtask, and an object part of the complex multipart object on which the user action is to be performed.

18. The data processing system of claim 15, wherein generating content for the mixed reality experience based on the task list using the vision-language model planner further comprises:

interactively guiding the user through a list of subtasks associated with a task to be performed.

19. The data processing system of claim 15, wherein the machine-readable storage medium further includes instructions configured to cause the processor alone or in combination with other processors to perform operations of:

presenting action symbols associated with the task to be performed for each of the subtasks of the plurality of subtasks, the action symbols providing a graphical representation of an action to be performed for each subtask.

* * * * *